United States Patent Office 3,551,101
Patented Dec. 29, 1970

---

3,551,101
PREPARATION OF SINTERED
ALUMINUM NITRIDE
Shigetomo Matsuo, 207–6 Higashi Ohizumi-machi, Nerima-ku, Tokyo, Japan; and Yosiaki Matsuki, 3 Komukai Nakano-cho; and Katsutoshi Komeya, 2008 Nakanoshima, both of Kawasaki-shi, Japan
No Drawing. Continuation-in-part of application Ser. No. 475,882, July 29, 1965. This application Aug. 12, 1968, Ser. No. 751,709
Int. Cl. C01b 21/06
U.S. Cl. 23—192                                    1 Claim

ABSTRACT OF THE DISCLOSURE

A method of preparing a sintered mass of aluminum nitride comprising an initial step of heating a mixture consisting of 85 to 55 percent by weight of aluminum nitride powder and 15 to 45 percent by weight of aluminum powder in a nitrogen atmosphere under pressure and at an elevated temperature to bond together the particles of aluminum nitride by melting the aluminum contained in the mixture and a final step of heating the mixture in a nitrogen atmosphere under pressure and at more elevated temperature so as to sinter the mixture.

---

CROSS-REFERENCES TO RELATED APPLICATION

This is a continuation-in-part of application Ser. No. 475,882, filed July 29, 1965.

BACKGROUND OF THE INVENTION

This invention relates to a method of preparing a sintered mass of aluminum nitride and more particularly to a method of preparing sintered aluminum nitride from a mixture of powders of aluminum nitride and aluminum by hot-pressing.

While aluminum nitride decomposes by sublimation at a temperature of 2,450° C. without being converted into a liquid phase, it has a thermal conductivity of 0.053 cal./cm./sec. ° C. at 600° C., for example, which is two or three times larger than that of alumina, so that it has superior high temperature strength and smaller thermal expansion coefficient than other ceramics. As a result, aluminum nitride has good thermal shock resistance and can well resist quenching of from 2,200° C. to room temperature. With regard to its stability, it is relatively stable against heating at elevated temperatures not only in nitrogen and other inert atmospheres but also in a hydrogen atmosphere. For example, it shows oxidation of only 0.3% when heated to 1,400° C. for 3 hours in an air atmosphere and only 10% when heated to 1,700° C. for 4 hours. In addition, aluminum nitride is not corroded by acids and molten metals, and especially has high corrosion resistance against molten aluminum. Further, its electrical insulating property and dielectric constant are particularly high in a high frequency region and its dielectric loss factor is extremely low, thus maintaining a constant value of 0.03 at a frequency of $10^9$ cycles per second and at a temperature below 500° C., for example.

In view of these superior characteristics, aluminum nitride has wide applications as heat resisting materials, electrical insulating materials, dielectrics for high temperature use, melting pots for silicon, germanium, gallium, aluminum, and glass, and crucibles for evaporating aluminum and the like purposes.

Depending upon the particular application, it has been the practice to shape aluminum nitride powder into the desired configuration, and then sinter the shaped article in a nitrogen atmosphere to provide a sintered mass of aluminum nitride. However, since aluminum nitride does not assume a liquid phase at ordinary pressures but is merely bonded together by the binding force due to solid diffusion, the sintered mass is fragile. As a consequence, it is necessary to carry out the sintering treatment at relatively high temperatures and for a relatively long time. Further, sintered masses involve many practical shortcomings such as low density, low strength and large porosity.

One of the objects of this invention is to provide a sintered mass of aluminum nitride of high density and high strength from a mixture of powders of aluminum nitride and aluminum.

Another object of this invention is to prepare a sintered mass of aluminum nitride from a mixture of powders of aluminum nitride and aluminum, which is highly suitable for use as heat resisting materials, electrical insulators, dielectrics for high temperature use or melting pots of metals, glass and the like.

The present invention is characterized by the steps of preparing a mixture of between 85 to 55% by weight of aluminum nitride powder, and between 15 to 45% by weight of aluminum powder, heating said mixture of powders in a nitrogen atmosphere under pressure to melt the aluminum content of the mixture so as to bind together the particles of aluminum nitride, continuing to heat the mixture in the nitrogen atmosphere, and elevating the heating temperature to a value sufficient to cause the secondary nitrogenation of the molten aluminum, thus sintering the mixture of powders.

When powders of both aluminum and aluminum nitride mixed within the aforementioned range of blending proportions or said mixture pre-shaped into a compressed powdered body is sintered under pressure in a nitrogen atmosphere, the metallic aluminum powder, one of the constituents of the mixture, will be melted first to flow into and fill interstices between the particles of aluminum nitride as the process of sintering treatment in the nitrogen atmosphere proceeds. More particularly, the aluminum powder not only acts as a binder but also fills the interstices or air gaps of the mixture greatly to decrease porosity. On the other hand, as the heating temperature is increased, the molten aluminum that has filled up the interstices between the particles of aluminum nitride will be gradually nitrogenized at a temperature of above approximately 600° C. to form secondary aluminum nitride. Thus, the diffusion of nitrogen gas causes the aluminum contained in the mixture to be gradually nitrogenized starting from the surface portion thereof until the aluminum in the mixture is perfectly nitrogenized by a sintering treatment up to about 2,000° C., thus producing a sintered mass solely consisting of aluminum nitride.

While there is no particular limit on the particle size of the raw powders, a particle size in a range of from 100 meshes to several microns was found suitable.

As described above, the blending proportions of both components, namely, aluminum nitride powder and aluminum powder are set at 85 to 55 percent by weight and 15 to 45 percent by weight respectively. This limitation is for the following reason. According to the method of the present invention, the powdered aluminum contained in the mixture is thermally melted into a fluid viscous form to fill up the interstices between the aluminum nitride particles and bind them together, so that the whole mixture is made into a rigid mass by further sintering. Consequently the larger content of aluminum powders should naturally lead to a more rigid uniformly sintered mass. However, where unduly large proportions of aluminum are mixed, the metal tends to cause its molten particles to be agglomerated among themselves after being made viscous and fluidized under such condition. Consequently the aluminum content beyond a certain limit, namely, 45 percent will result in a non-uniform sintered structure. To avoid such an objectionable situation, it is necessary that the aluminum nitride particles be uniformly present in the interstices between the aluminum particles in order to prevent the latter particles from gathering among themselves. Based on this requirement, the aluminum content is limited to 45 percent. Conversely, where the proportions of aluminum powder are as low as less than 15 percent, it will be impossible to obtain a sintered body of great mechanical or flexural strength. It will be understood that the blending ratios of aluminum nitride powder and aluminum powder may be suitably varied within the aforementioned ranges respectively according to the particular applications intended. For instance, in order to obtain a sintered mass for use in a melting pot where a relatively high mechanical strength is required, the proportion of aluminum powder is increased but may be decreased, if requirements for the strength are not severe.

In case of pre-shaping the mixture of raw powders, a suitable binder such as stearic acid, polyvinyl alcohol or solid polyethylene glycol (for example, those sold by Carbide and Carbon Co., of U.S.A. under the trade name of Carbowax) and the like may be incorporated into and mixed with the mixture of raw powders. However, where such a binder is used, it is preferable to dry the body thus pre-shaped at room temperature and then heat and dry it at a temperature within a range of about 200° C. to 400° C. in vacuum, in a nitrogen atmosphere, or in an inert atmosphere in order to prevent oxidation of aluminum by volatilization of the binder prior to its nitrogenation.

The sintering procedure comprises an initial heating step wherein the aluminum content of the mixture is melted to bind together the particles of aluminum nitride and a final heating step wherein the aluminum is nitrogenized to form a secondary aluminum nitride. Generally, the initial heating step is carried out by elevating the temperature to about 1,000° C. or higher from room temperature, whereas the final heating step is carried out by heating to a temperature of from about 1,000° C. to about 2,000° C. and if required by gradually increasing the temperature at a suitable rate. The final sintering temperature preferably ranges between 1,400° C. and 2,000° C. Higher temperature than 2,000° C. will undesirably lead to the partial decomposition or sublimation of aluminum nitride. The temperature and time of sintering are adjusted in a suitable manner dependent upon the composition of the mixture of raw powders, configuration of the pre-shaped body and other factors. More particularly, it is preferable to prolong the final sintering time if the pre-shaped body is massive or thick and contains large amounts of aluminum powder. Conversely, where the content of aluminum is low, or the pre-shaped body is small or thin, the final sintering time may be decreased.

Sintering may be carried out by the so-called hot press process wherein the mixture of raw powders or a pre-shaped body thereof is heated in a carbon mold under pressure in a nitrogen atmosphere. While the sintering pressure may be applied as far as the carbon mold can resist, it may be suitably varied according to the industrial scale employed.

The sintered mass of aluminum nitride prepared by the method of this invention has a low porosity and a prominently great mechanical strength.

Pressurized sintering particularly used in the present invention easily produces a compact sintered mass. Since the mass is kept under pressure and at elevated temperatures even after completion of the nitrogenation reaction, it will have an extremely high density. Moreover the sintered mass substantially consisting of aluminum nitride has excellent properties including heat resistance and electrical insulation. Consequently this sintered mass is very suitable for use in ordinary heat resistant materials, electrical insulating materials and dielectrics for high temperature use. Further, low porosity and high mechanical strength make the sintered mass also suitable for use in melting pots or vessels for metals such as silicon, germanium, gallium or aluminum as well as for glass and vessels for vacuum evaporation coating.

The following examples are given only by way of illustration, and are not to be construed as limiting in any way the scope and spirit of the invention.

EXAMPLE 1

There were formed rod samples 8 mm. in diameter and 15 mm. long at a pre-shaping pressure of 2 ton/cm.$^2$ from a mixture consisting of various proportions of 325-mesh pass aluminum nitride powder and 325-mesh pass aluminum powder, to which there was added 5 percent by weight of stearic acid as a binder. While introducing nitrogen gas, the rods were preliminarily heated to 400° C. for complete elimination of the binder to obtain samples to be further sintered.

The samples of various compositions were respectively placed in a carbon mold comprising a tubular mortar 8.3 mm. in inner diameter, 23 mm. in outer diameter and 55 mm. high and a push rod 8 mm. in diameter and 50 mm. long. The carbon mold had a concurrent use as a heating element and its temperature could be electrically raised. The carbon mold containing a sample was disposed in an electrical furnace, into which nitrogen gas was introduced at the rate of 300 l./hr. The temperature was increased stepwise as 200° C./hr. up to 550° C., 50° C./hr. from 550° to 750° C., 300° C./hr. up to 1,700° C. At 1,700° C. the sample was sintered for two hours and then allowed to cool. When the sintering temperature reached 550° C., a pressure of 400 kg./cm.$^2$ was applied by the push rod located at the top of the carbon mold. Sintering was continued under such pressurized condition until the sample was allowed to cool. All sintered samples solely consisted of aluminum nitride and were extremely compact. Table 1 below presents the raw material composition of each sample, as well as the density and flexural strength of the sintered product.

TABLE 1

| Raw material composition (wt. percent) | | Sintered product | | |
|---|---|---|---|---|
| Aluminum nitride | Aluminum | Density (percent) (ratio to theoretical density) | Flexural strength (kg./cm.$^2$) | Interior structure |
| 85 | 15 | 92.3 | 20.0 | Uniform. |
| 75 | 25 | 95.1 | 23.5 | Do. |
| 65 | 35 | 95.8 | 25.0 | Do. |
| 55 | 45 | 98.2 | 30.5 | Do. |
| 45 | 55 | -------- | 33.2 | Non-uniform. |

As clearly seen in Table 1 above, the increased proportion of aluminum resulted in the higher flexural strength of the sintered mass. However, the aluminum content beyond 45 percent rendered the interior structure thereof undesirably non-uniform.

EXAMPLE 2

Two fresh rod samples having the particular composition of 75% aluminum nitride and 25% aluminum as included in those of Example 1 were respectively charged into a carbon mold of the same type as that of Example 1 (excepting that the outer diameter was 28 mm.). The samples were sintered by high frequency heating in an atmosphere of nitrogen gas introduced at the rate of 800 l./hr. at a pressure of 100 and 800 kg./cm.$^2$ respectively and at a temperature which was finally raised to 1,900° C. stepwise at the rate of 100° C./hr. The samples were kept for two hours at this final temperature and then allowed to cool. As a result, the samples were sintered into extremely compact aluminum nitride, namely, the one sintered at a pressure of 100 kg./cm.$^2$ had a density accounting for 92.8 percent of the theoretical density 3.25 g./cc. and the one pressed to 800 kg./cm.$^2$ exhibited a density corresponding to 97.5 percent of the theoretical value. X-ray diffraction analysis showed that each sintered mass solely consisted of aluminum nitride.

EXAMPLE 3

Mixtures of raw powders having the compositions shown in Table 2 below were respectively charged into a carbon mold. Each sample was sintered in a nitrogen atmosphere at a pressure of 100 kg./cm.$^2$ and at a temperature raised stepwise as shown in Table 2.

TABLE 2

| Raw material composition (wt. percent) | | Time required in raising temperature from room temperature of 1,000° C. (hr.) | Time required in raising temperature from 1,000° C. to to 1,500° C. (hr.) |
| --- | --- | --- | --- |
| Aluminum nitride | Aluminum | | |
| 80 | 20 | 2 | 1 |
| 60 | 40 | 2 | 2 |

The sintered samples were extremely compact with a low porosity and shown by X-ray diffraction to be solely composed of aluminum nitride, indicating no presence of unreacted metallic aluminum and other aluminum compounds.

What is claimed is:

1. A method preparing a sintered mass of aluminum nitride comprising an initial step of heating a pre-shaped mixture of a composite raw material consisting of 85 to 55 percent by weight of aluminum nitride powder and 15 to 45 percent by weight of aluminum powder, up to about 1000° C. in a nitrogen atmosphere to bond together the particles of aluminum nitride by melting the aluminum contained in the mixture, and a final step of heating the resultant mixture under a pressure of 100 to 800 kg./cm.$^2$ and at a temperature of about 1000 to 1900° C. in a nitrogen atmosphere so as to sinter the mixture.

References Cited

UNITED STATES PATENTS

| 3,238,018 | 3/1966 | Winter et al. | 23—192 |
| 3,108,887 | 10/1963 | Lenie et al. | 23—204X |
| 2,929,126 | 3/1960 | Bollack et al. | 23—192X |

OSCAR R. VERTIZ, Primary Examiner

C. B. RODMAN, Assistant Examiner

U.S. Cl. X.R.

75—205